(12) United States Patent
Agarwal et al.

(10) Patent No.: US 7,761,408 B2
(45) Date of Patent: Jul. 20, 2010

(54) KEYWORD GENERATION AND MANAGEMENT FOR SELECTION OF CUSTOMIZED CONTENT FOR A USER DEVICE

(75) Inventors: Garima Agarwal, Santa Clara, CA (US); Ciaran T. Rochford, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 11/844,194

(22) Filed: Aug. 23, 2007

(65) Prior Publication Data

US 2008/0177721 A1 Jul. 24, 2008

Related U.S. Application Data

(60) Provisional application No. 60/886,045, filed on Jan. 22, 2007.

(51) Int. Cl.
*G06F 7/00* (2006.01)
*G06F 17/00* (2006.01)

(52) U.S. Cl. ..................................... 707/602
(58) Field of Classification Search ........................ None
See application file for complete search history.

(56) References Cited

U.S. PATENT DOCUMENTS

| | | | |
|---|---|---|---|
| 2002/0194061 A1* | 12/2002 | Himmel et al. | 705/14 |
| 2006/0190331 A1* | 8/2006 | Tollinger et al. | 705/14 |
| 2006/0248062 A1* | 11/2006 | Libes et al. | 707/3 |
| 2007/0039025 A1* | 2/2007 | Kraft et al. | 725/62 |
| 2008/0059299 A1* | 3/2008 | Hamoui | 705/14 |
| 2008/0108308 A1* | 5/2008 | Ullah | 455/41.2 |

OTHER PUBLICATIONS

Bulander et al, "Enabling Personalized and Context Sensitive Mobile Advertising while Guaranteeing Data Protection", Proceedings of the EURO-mGOV 2005, Brighton, UK Mobile Government International LLC, pp. 445-454.*

* cited by examiner

*Primary Examiner*—Uyen T. Le (57) ABSTRACT

A system for selecting customized content for a user device is provided. The system includes a processor and an information extractor that, when executed by the processor, is configured to obtain at least one keyword from analyzing data entered into the user device. The system includes a behavioral engine that, when executed by the processor, is configured to obtain at least one keyword from analyzing a behavior of a user of the user device. The system also includes a keyword manager that, when executed by the processor, is configured to receive at least two keywords from the information extractor and/or the behavioral engine and to analyze the at least two keywords to obtain a prioritized list of keywords and to provide the prioritized list of keywords to a component that is configured to select customized content for the user device based on the prioritized list of keywords.

24 Claims, 6 Drawing Sheets

KEYWORD GENERATION AND MANAGEMENT FOR SELECTION OF CUSTOMIZED CONTENT FOR A USER DEVICE

CROSS-REFERENCE TO RELATED APPLICATIONS

This application claims priority to U.S. Provisional Patent Application No. 60/886,045, entitled "Keyword Manager", filed on Jan. 22, 2007, by Garima Agarwal, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User devices used in telecommunications networks may offer additional functions beyond the standard voice communication functions. For example, text messaging applications, music applications, shopping applications, web browsing applications, games, and other applications might be provided on user devices. As used herein, the term "user device" can include mobile terminals such as mobile telephones, personal digital assistants, handheld computers, and similar devices, but can also include fixed terminals such as residential gateways.

SUMMARY

In one embodiment, a method for selecting customized content for a user device is provided. The method includes receiving information into the user device from a plurality of sources. The method includes analyzing the information to obtain at least one keyword from each of at least two of the plurality of sources, and analyzing the keywords from at least two of the plurality of sources to obtain a prioritized list of keywords. The method also includes using the prioritized list of keywords to select customized content for the user device.

In another embodiment, a system for selecting customized content for a user device is provided. The system includes a processor and an information extractor that, when executed by the processor, is configured to obtain at least one keyword from analyzing data entered into the user device. The system includes a behavioral engine that, when executed by the processor, is configured to obtain at least one keyword from analyzing a behavior of a user of the user device. The system also includes a keyword manager that, when executed by the processor, is configured to receive at least two keywords from at least one of the information extractor and the behavioral engine. The keyword manager is further configured to analyze the at least two keywords to obtain a prioritized list of keywords and to provide the prioritized list of keywords to a component that is configured to select customized content for the user device based on the prioritized list of keywords.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Embodiments of the present disclosure can provide an enhanced user experience for users of user devices in telecommunications networks. Information from multiple sources can be combined to create a highly personalized interest profile for a user. The profile can then be used to customize content that is displayed on the user device. The information sources used to create the profile might include information the user enters into applications on the user device, information deduced about the user based on the user's behavior, generally known information such as the dates of holidays and other special events, and other sources.

The user interest profile can be based on a set of keywords generated by a keyword manager. Information from each of the information sources might be used to generate keywords related to that specific information source. These source-specific keywords can then be correlated to one another to generate high-level keywords that reflect the user's interests and preferences across a broad range of information sources. The high-level keywords can then be prioritized and used to provide the user with content that is personalized and customized to a greater degree than might be possible when information from only a single source is considered.

Figure 1:
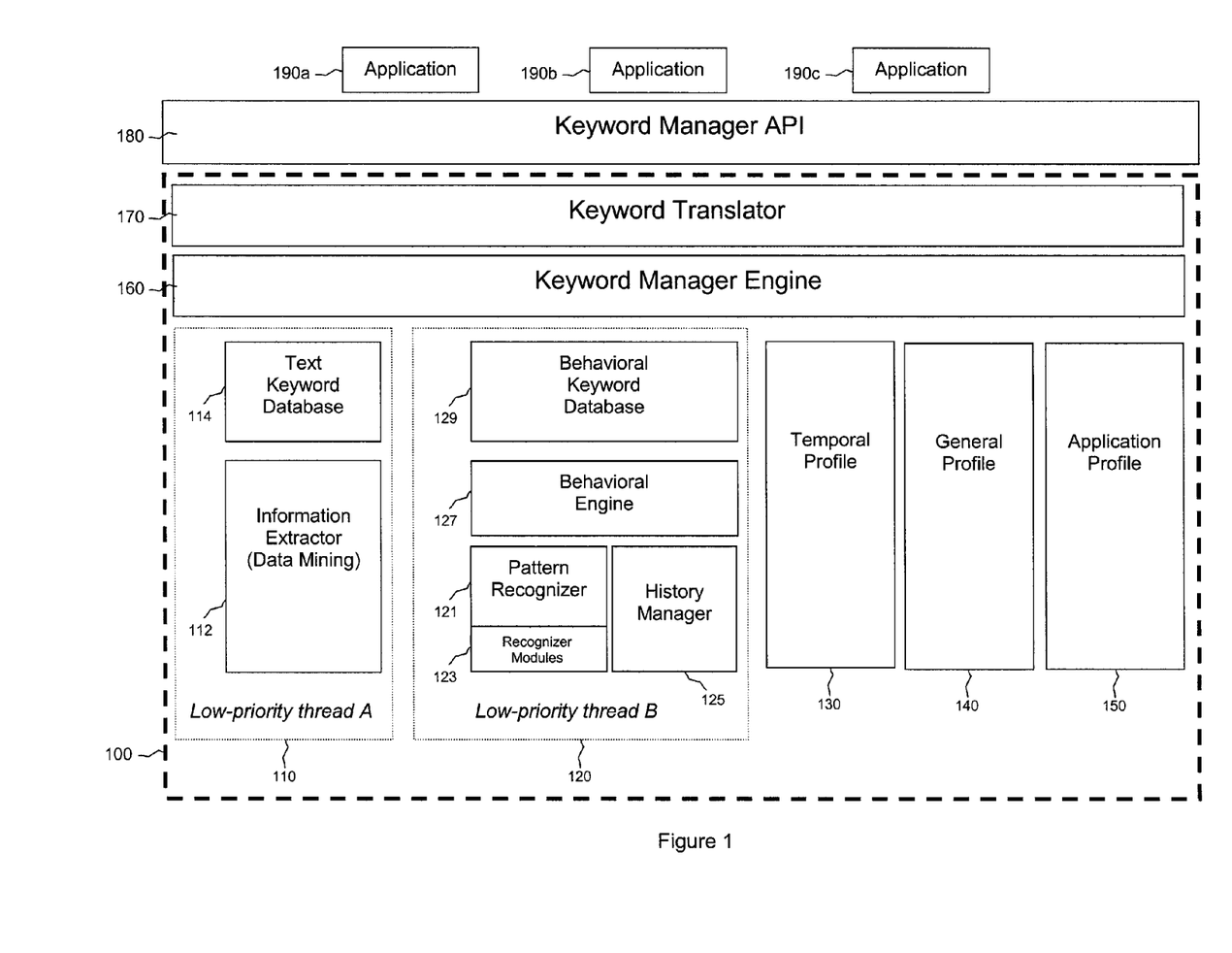
FIG. 1 is a diagram of a keyword manager according to an embodiment of the disclosure.

FIG. 1 illustrates an embodiment of a keyword manager 100 that can provide enhanced experiences for users of user devices. The keyword manager 100 includes an information extraction component 110, a behavior recognition component 120, a temporal profile 130, a general profile 140, an application profile 150, a keyword manager engine 160, and a keyword translator 170. A keyword manager application programming interface (API) 180 provides an interface between the keyword manager 100 and one or more applications 190 on the user device or other external elements. The keyword manager API 180 might also provide an interface between the user and one or more of the components in the keyword manager 100.

The information extraction component 110 receives data that a user enters into a user device and extracts pertinent keywords from the entered data. The information extraction component 110 can include two components, an information extractor 112 and a text keyword database 114. Data that the user types, speaks, or otherwise enters into the user device is captured by the information extractor 112. For example, the information extractor 112 might capture the keystrokes that the user enters into an instant messaging (IM) program, a short message service (SMS) program, or a similar communication program. The information extractor 112 might also include a voice recognition component that can capture words spoken by the user, such as voice commands and words spoken in the course of telephone conversations.

The information extractor 112 can analyze the words it captures to generate keywords that reflect the user's interests and preferences. However, the information extractor 112 does not merely recognize the words it captures and consider the words that are used repeatedly to be keywords. Instead, the information extractor 112 has the capability to understand the meaning and context of the words it captures and base the keywords it generates on inferences about the user's intent when using the words.

For example, if the user, during the course of a conversation, repeatedly expressed a dislike for a particular product, it would not be desirable to consider the name of that product to be a keyword and to base the content that is provided to the user on the name of that product. The information extractor 112 would be capable of recognizing the context in which the name of the product was used and would not generate a keyword based on the product name. On the other hand, the information extractor 112 might be capable of generating a keyword based on a product name that is used in a favorable context, even if the product name is used only a small number of times.

While this example has referred to the generation of keywords based on product names, it should be understood that keywords might be generated based on any words that the user speaks, types, or otherwise enters into the user device. After the information extractor 112 generates a keyword, the information extractor 112 stores the keyword in the text keyword database 114.

The behavior recognition component 120 can generate keywords based on the user's behavior. Types of behavior that can be recognized and analyzed might include the applications the user has launched, web sites visited, items purchased, music or video clips played, maps requested, and other activities the user has engaged in by means of the user device. The time of day, day of the week, date, and/or other time-related parameters at which the user engaged in the activities might also be recorded. The frequency of occurrence of such events might also be noted.

Behavior-related data gathered in such a manner can be correlated across multiple applications to infer the user's short term and long term interests. These interests can be prioritized and then used to build a profile of the user. The profile might be summarized in one or more keywords and the keywords can be stored for future use in determining content to be provided to the user.

The behavior recognition component 120 can include a pattern recognizer 121, a history manager 125, a behavioral engine 127, and a behavioral keyword database 129. The pattern recognizer 121 can recognize patterns in the user's behavior and might include one or more recognizer modules 123. Each of the recognizer modules 123 is capable of recognizing a particular type of behavior. For example, one recognizer module 123 might recognize time-related parameters of the user's behavior, such as which activities occur in the morning, which activities occur on weekends, which activities occur on holidays, and so on. Another recognizer module 123 might recognize the applications the user has launched, another recognizer module 123 might recognize the web sites the user has visited, and so on.

Time-related data recognized by the recognizer modules 123 might be stored in the history manager 125. The history manager 125 might then attempt to detect a usage pattern based on the time-related data. The history manager 125 and the pattern recognizer 121 can send their data to the behavioral engine 127 and the behavioral engine 127 can process the information to create a short term or long term user behavior pattern. The behavioral engine 127 might then summarize the behavior pattern in one or more keywords.

As an example of a short term interest, it might be recognized the user has recently purchased music from a particular band via a web browsing application and has recently listened to music from the same band via an audio player application. The behavioral engine 127 might correlate these two pieces of information from different applications to infer that the user is currently interested in that band. The behavioral engine 127 might then generate a keyword related to the band and the keyword might indicate that it is related to a short term interest.

As an example of a long term interest, it might be recognized the user purchased tickets online for a football game during football season, frequently does web searches for baseball statistics during baseball season, and plays an electronic golf simulation game throughout the year. The behavioral engine 127 might correlate these pieces of information from different applications to infer that the user has a long term interest in sports. The behavioral engine 127 might then generate a keyword related to sports and the keyword might indicate that it is related to a long term interest.

As another example, it might be recognized that the user purchased music in a particular genre but then never purchased more music in that genre. The behavioral engine 127 might infer that the user was merely investigating whether the genre was of interest or that the user made the purchase as a gift and that the user is not personally interested in the genre. The behavioral engine 127 might not generate a keyword related to the genre or might generate a negative keyword indicating that the user has no interest in the genre.

The behavioral engine 127 can prioritize the keywords generated in this manner to create a hierarchical profile of the user's short term and long term interests. For example, if the user's behavior indicates that the user is interested in both sports and music but has more interest in sports than in music, a sports-related keyword might be given a higher priority than a music-related keyword. The behavioral engine 127 can then store the prioritized keywords in the behavioral keyword database 129.

The temporal profile 130 acts as a calendar that is aware of time-related parameters. For example, the temporal profile 130 might be aware of the time of day, the day of the week, the calendar date, and the season of the year. The temporal profile 130 might also be aware of the dates when annual holidays and festivals, such as Christmas or Valentine's Day, fall. In addition, the temporal profile 130 might be aware of when recurring special events are scheduled to occur. For instance, the temporal profile 130 might be aware of the date when Mardi Gras falls, the date when the Super Bowl will be played, the weeks when the Summer Olympics will be held, the dates when an annually performed play will be staged, or the dates for other events that occur regularly but not necessarily on the same date for each occurrence.

The general profile 140 contains general information about the user. For example, the general profile 140 might include the user's age, gender, occupation, marital status, number of children, city of residence, and other personal details about the user. The user might manually enter this information into the user device, for example through the keyword manager API 180. The user device might include a questionnaire that solicits this information from the user, receives the user's responses, and stores the responses in the general profile 140.

The application profile 150 contains information related to the applications that the user has launched on the user device and the activities that the user has engaged in while in those applications. For example, the application profile 150 might include information about the user's browsing history in a browser application, web searches the user has conducted in a browser application, purchases the user has made through a shopping application, and other application-related data. The application profile 150 might also include information about the user's personal preferences that the user has entered into an application. In addition, the application profile 150 might keep track of the applications currently executing on the user device and the functions that those applications perform. For instance, the application profile 150 might include the fact that a gaming application is currently executing on the user device and that the game has a sports-related theme.

The keyword manager engine 160 can receive information from the information extraction component 110, the behavior recognition component 120, the temporal profile 130, the general profile 140, and the application profile 150. The keyword manager engine 160 can then correlate the data from these disparate sources to characterize the content that is appropriate to be provided to the user device. That is, the keyword manager engine 160 can combine keywords from the text keyword database 114 and keywords from the behavioral keyword database 129 with data from the temporal profile 130, the general profile 140, and the application profile 150, and can create a prioritized list of keywords that it deems most relevant to the user at the current time. The keyword manager engine 160 can then cause content associated with these prioritized keywords to be provided to the user device, as described in more detail below.

In an embodiment, the keyword manager engine 160 might pass keywords through the keyword translator 170. The prioritized keywords generated by the keyword manager engine 160 might not necessarily be recognizable to the applications that use the keywords. The keyword translator 170 can translate keywords from the format used by the keyword manager engine 160 to a format that is recognizable to the applications that use them, such as the applications 190. For example, the keyword manager engine 160 might encode an inferred user interest in sports by using the keyword "sports". A vendor application that uses keywords provided by the keyword manager engine 160 might encode an interest in sports using a different keyword or some other numeric or symbolic representation. The keyword translator 170 could translate the keyword "sports" into an equivalent representation used by the vendor application.

The keyword translator 170 might be a single, universal component that can translate keywords from the format used by the keyword manager engine 160 into any format used by any application. Alternatively, the keyword translator 170 might include separate modules, each dedicated to translating from the keyword manager engine format into the format of a single application. A combination of one or more translation modules for multiple applications and one or more translation modules for individual applications is also possible.

The keyword manager API 180 is an interface between the keyword manager 100 and the applications 190 that interact with the keyword manager 100. Translated keywords can be passed from the keyword manager 100 to the applications 190 via the keyword manager API 180 and used by the applications 190. Information entered into the applications 190 can be passed from the applications 190 to the keyword manager 100 via the keyword manager API 180 and used by the keyword manager 100 to generate keywords.

The applications 190 might be native to the user device or might be external applications that have been installed on the user device post-purchase. As mentioned previously, the applications 190 can make use of information received from the keyword manager 100 and can provide information to the keyword manager 100. As discussed in more detail below, the content that is provided to the applications 190 can be generated by the applications 190 themselves based on the keywords provided to the applications 190 or can be generated elsewhere based on the keywords and then provided to the applications 190.

The functions performed by the information extraction component 110 and the behavior recognition component 120 can consume a great deal of processing power. Since the keyword manager 100 might be installed on a mobile telephone or a similar user device with limited processing power, the execution of the information extraction component 110 and the behavior recognition component 120 might cause a deterioration in the performance of other applications on the user device. In an embodiment, the information extraction component 110 and the behavior recognition component 120 can be placed in low priority processing threads that execute only when higher priority applications are not executing.

For example, the information extraction component 110 might be placed in a low priority thread A and the behavior recognition component 120 might be placed in a low priority thread B. Low priority thread A and low priority thread B might be scheduled to execute only late at night when other applications are not likely to be executing. Alternatively, a monitoring component on the user device might monitor the processing resources in use on the user device and might allow low priority thread A and low priority thread B to execute in the background when it is determined that those threads can execute without disruption to higher priority applications. The results of the processing of low priority thread A and low priority thread B can be made available for use by the keyword manager engine 160 in real time.

Figure 2:
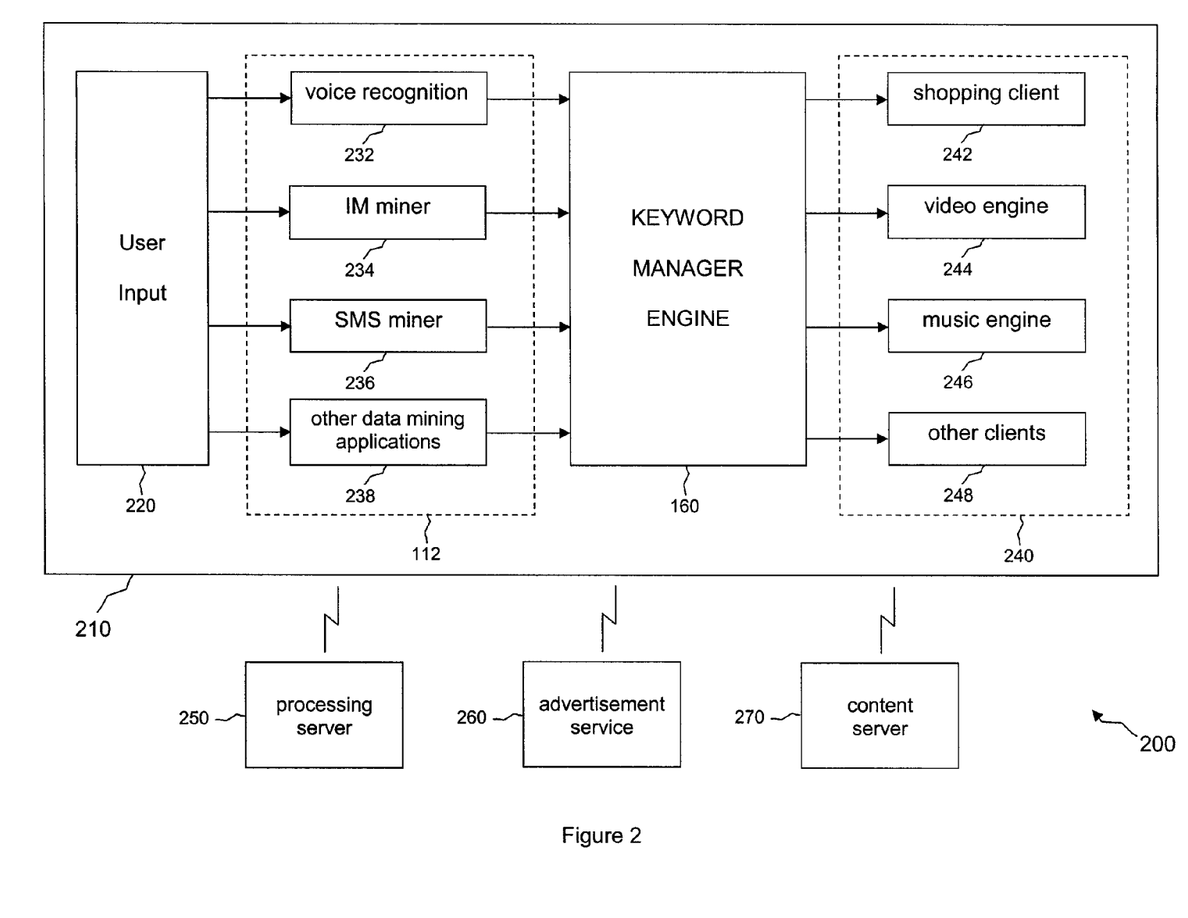
FIG. 2 is a diagram of a system that includes the keyword manager according to an embodiment of the disclosure.

FIG. 2 illustrates an embodiment of a system 200 that can include the keyword manager 100. The keyword manager 100 in this embodiment is included in a user device 210, however in other embodiments the keyword manager 100 or execution of its functionality might be elsewhere. User input 220 that is made into the user device 210 can pass through various information extraction modules, which might include a voice recognition module 232, an IM miner module 234, an SMS miner module 236, and other data mining applications 238.

The voice recognition module 232 can capture sounds made by the user, such as voice commands and words spoken in the course of telephone conversations. The voice recognition module 232 can then analyze the sounds to generate keywords, as described above.

The IM miner 234 and the SMS miner 236 can analyze the user input 220 that is made into IM programs and SMS programs, respectively. The IM miner 234 and the SMS miner 236 can then generate keywords based on the IM and SMS data. Similarly, the other data mining applications 238 can analyze the user input 220 from other sources and generate keywords from these other sources of user input 220.

Keywords generated by the voice recognition module 232, the IM miner 234, the SMS miner 236, and the other data mining applications 238 can be stored in the text keyword database 114 of FIG. 1. Thus, the voice recognition module 232, the IM miner 234, the SMS miner 236, and the other data mining applications 238 collectively can be considered substantially similar to the information extractor 112 of FIG. 1.

Keywords generated by the information extractor 112 can be fed, via the text keyword database 114, into the keyword manager engine 160, as described above. Keywords from the behavior recognition component 120, the temporal profile 130, the general profile 140, and the application profile 150 of FIG. 1, which are not shown in FIG. 2, can also be fed into the keyword manager engine 160. The keyword manager engine 160 can then process the keywords as described above and make the results of its processing available to the keyword translator 170 and the keyword manager API 180 of FIG. 1, which are not shown in FIG. 2.

As described above, the keyword manager engine 160 can create a prioritized list of keywords from the data it receives from the information extraction component 110, the behavior recognition component 120, the temporal profile 130, the general profile 140, and the application profile 150. As mentioned previously, the functions performed by the information extraction component 110, the behavior recognition component 120, and the keyword manager engine 160 can consume a great deal of processing power. In an embodiment, a portion of the data that might otherwise be processed by these components is instead transmitted to a remote processing server 250 and processed by the processing server 250. The processing server 250 might be a component in a telecommunications network with which the user device 210 can wirelessly communicate.

After processing the data transmitted by the user device 210, the processing server 250 can then return the processed data to the information extraction component 110, the behavior recognition component 120, and/or the keyword manager engine 160. The information extraction component 110, the behavior recognition component 120, and/or the keyword manager engine 160 can then make use of the processed data as if the data had been processed internally by those components. The processing performed by the processing server 250 can occur in addition to or instead of the processing that is performed on the user device 210 by low priority thread A and low priority thread B, as described above. The data that is transmitted to the processing server 250 might be limited by the constraints on the transmission of private data. Remote processing of user input 220 in this manner can reduce the processing burden on the information extraction component 110, the behavior recognition component 120, and the keyword manager engine 160 and free processing resources on the user device 210 for other purposes.

The prioritized keywords generated by the keyword manager engine 160 can be made available to a set of keyword consumption applications 240. The keyword consumption applications 240 might include a shopping client 242, a video engine 244, a music engine 246, and/or other clients 248. These applications 240 can use the keywords generated by the keyword manager engine 160 to provide customized content to a user of the user device 210 who uses the applications 240. While the applications 240 are referred to as keyword consumption applications 240, it should be understood that, in addition to using the keywords, the applications 240 might also feed data back into the keyword manager 100 for use in generating keywords, as described in regard to the applications 190 of FIG. 1. The applications 190, however, might include applications that provide data to the keyword manager 100 but do not make use of the keywords generated by the keyword manager 100.

One type of customized content that might be provided by the keyword consumption applications 240 is advertising. For example, when a user selects one of the applications 240 to launch, an advertisement might appear on the user device 210 before the application 240 is launched. Alternatively, the advertisement might appear when the application 240 is closed or might appear in the application 240 itself. The advertisement might be customized for the user based on the keywords generated by the keyword engine 160. The type of application 240 that is launched might also be taken into consideration in determining the content of the advertisement.

In an embodiment, an advertisement service 260 can determine the content of the advertisement that is displayed on the user device 210. That is, when one of the applications 240 is launched, the keyword manager 100 might send the advertisement service 260 any keywords that might be relevant to the current circumstances. The advertisement service 260 might then select an advertisement based on the keywords and return the advertisement to the user device 210. In an embodiment, a set of advertisements available for selection by the advertisement service 260 can be stored in a content server 270 and retrieved by the advertisement service 260 or by the user device 210. Alternatively, the advertisements might be stored in the applications 240 or elsewhere in the user device 210 and might be selected by the advertisement service 260 for display on the user device 210. In another embodiment, the advertisement service 260 and the content server 270 can be a single component.

The content stored in the content server 270 might be created by the entity that manages the advertisement service 260 or the content might be created by an entity that manages one of the applications 240 or some other third party and made available for use by the advertisement service 260. Also, all or a portion of the functionality provided by the advertisement service 260 might reside in the keyword manager engine 160, in the applications 240, and/or in other components on the user device 210.

An example can illustrate how the keywords generated by the keyword manager 100 can be used to provide customized advertising content to the user device 210. The temporal profile 130 might indicate that the current day is Valentine's Day. A user's general profile 140 might indicate that the user is married. The information extractor 112 might determine that the user has recently performed a text search in the music engine 246 for a CD of love songs. The keyword manager engine 160 might use these pieces of information from multiple disparate sources to infer that the user might be interested in purchasing a gift for their spouse for Valentine's Day. When the user opens the shopping client 242, an appropriate set of keywords might be sent to the advertisement service 260 indicating this inferred interest. The advertisement service 260 might then retrieve an appropriate advertisement, such as an advertisement from a florist, from the content server 270 and transmit the advertisement to the user device 210. The user device 210 might then cause the advertisement to be displayed before the shopping client 242 is launched.

As another example, the application profile 150 might indicate that the user has recently conducted a web search for a home loan. The behavioral engine 127 might indicate that the user is interested in sports. The keyword manager engine 160 might combine these pieces of information to create one or more keywords that indicate interests in both new homes and sports. When the user launches one of the applications 240, these keywords might be sent to the advertisement service 260. The advertisement service 260 might then retrieve an advertisement for a housing development on a golf course, or a similarly customized advertisement, from the content server 270. The advertisement service 260 could then transmit the advertisement to the user device 210 for display before the application 240 is launched.

The customized content that is provided to the user device 210 based on the keywords is not necessarily an advertisement. For example, when the user launches the video engine 244 or the music engine 246, suggestions might be offered to the user for video clips or songs that might be of interest to the user based on keywords that the keyword manager engine 160 has previously derived. Alternatively, the user might be given suggestions for free software downloads or other enhancements that might improve the user's experience when using the user device 210. In light of such possibilities, the component that is referred to in FIG. 2 as the advertisement service 260 might be more generally referred to as a content selection service. Such a content selection service might operate in a manner similar to that described above in regard to the advertisement service 260. That is, the content selection service could use keywords received from the keyword manager 100 to select appropriate content and could retrieve the appropriate content from the content server 270 and return the content to the user device 210.

Figure 3:
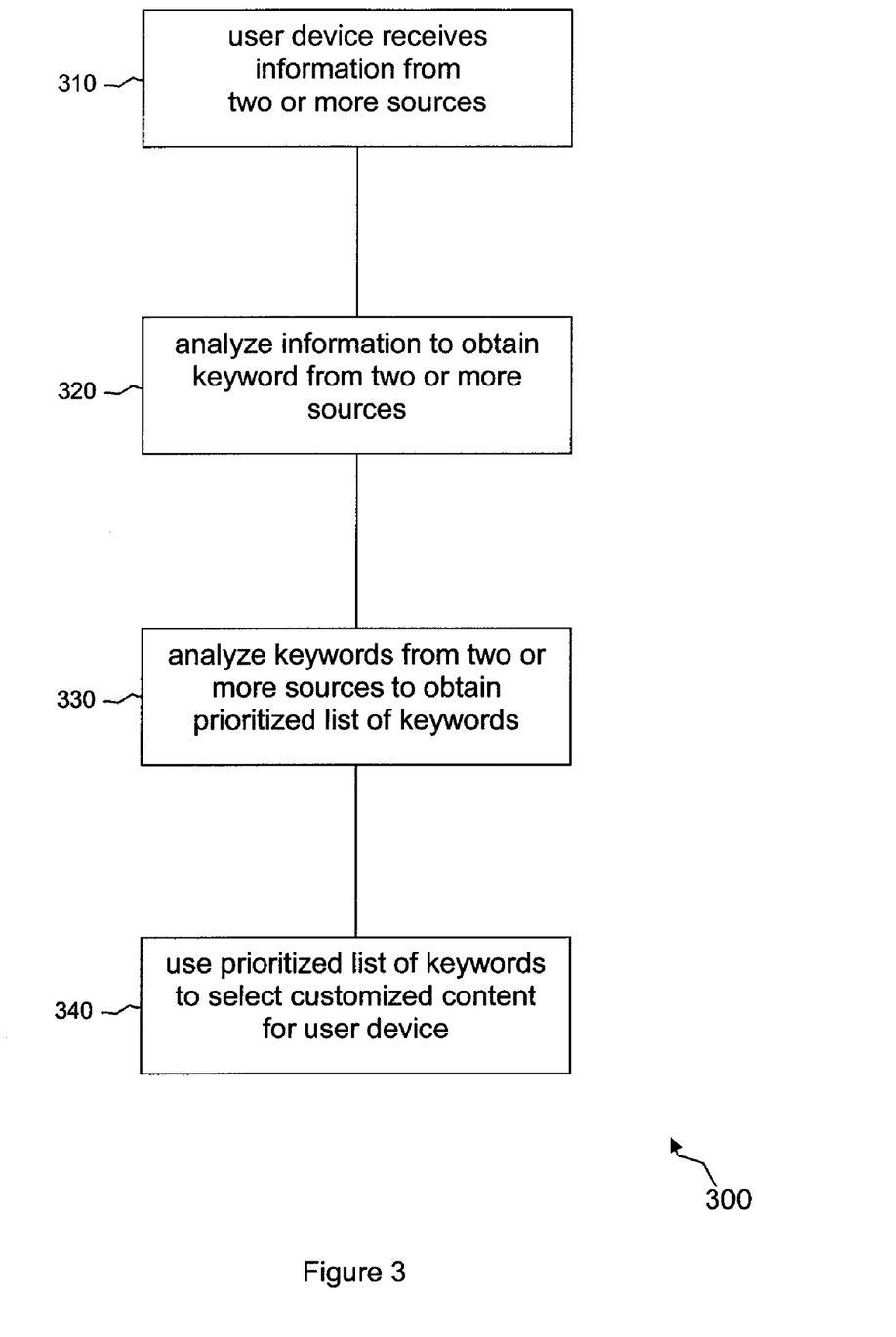
FIG. 3 is a diagram of a method for selecting customized content for a user device according to an embodiment of the disclosure.

FIG. 3 illustrates an embodiment of a method 300 for selecting customized content for a user device. In block 310, a user device receives information from two or more sources. In block 320, the information is analyzed to obtain at least one keyword from each of at least two sources. In block 330, the keywords are analyzed to obtain a prioritized list of keywords. In block 340, the prioritized list of keywords is used to select customized content for the user device.

Figure 4:
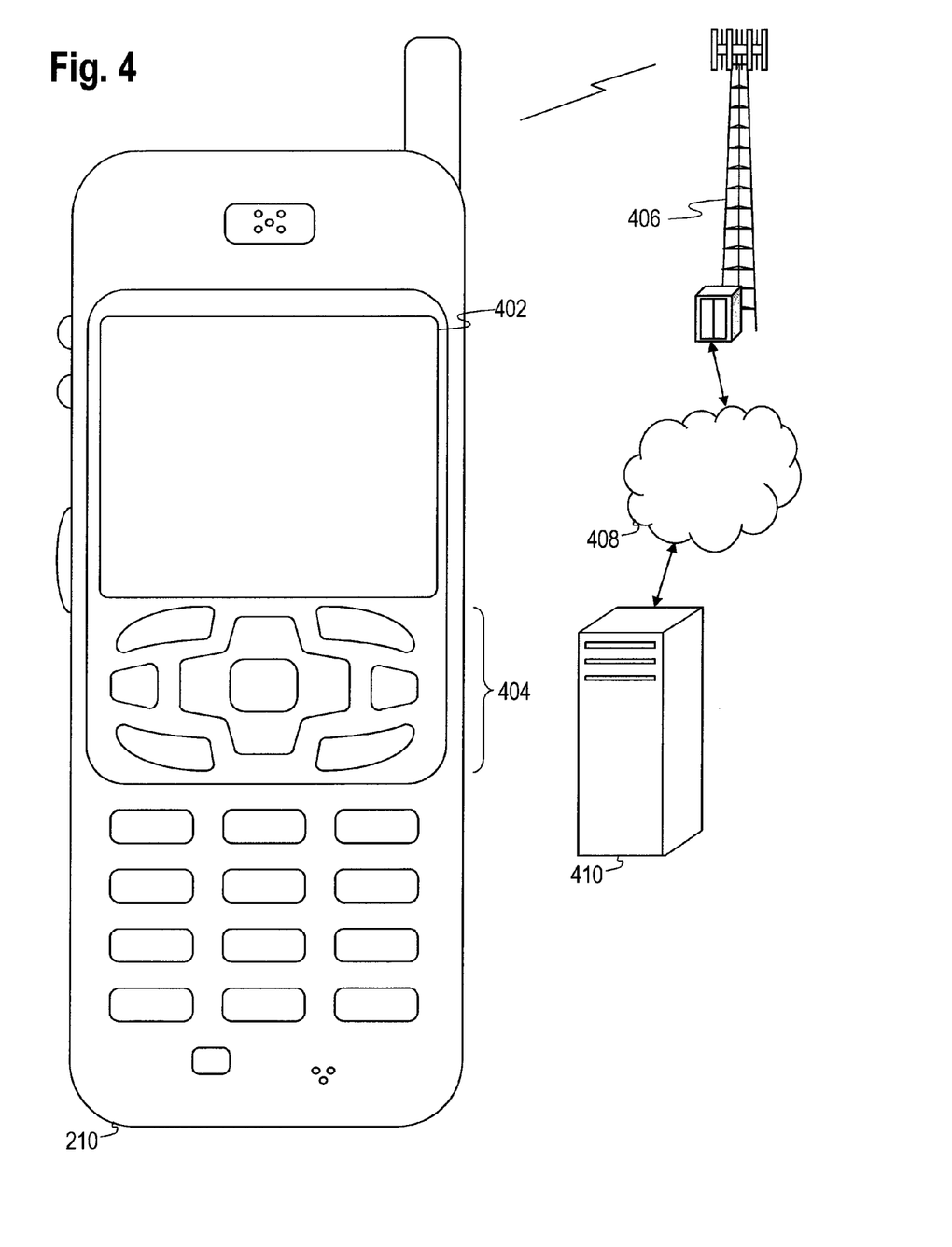
FIG. 4 is a diagram of a wireless communications system including a user device operable for some of the various embodiments of the disclosure.

FIG. 4 shows a wireless communications system including an embodiment of the user device 210. The user device 210 may be operable for implementing aspects of the present disclosure, but the present disclosure should not be limited to these implementations. Though illustrated as a mobile phone, the user device 210 may take various forms including a wireless handset, a pager, a personal digital assistant (PDA), a portable computer, a tablet computer, or a laptop computer. Many suitable handsets combine some or all of these functions. In some embodiments of the present disclosure, the user device 210 is not a general purpose computing device like a portable, laptop or tablet computer, but rather is a special-purpose communications device such as a mobile phone, wireless handset, pager, or PDA. The user device 210 may support specialized activities such as gaming, inventory control, job control, and/or task management functions, and so on.

The user device 210 includes a display 402 and a touch-sensitive surface or keys 404 for input by a user. The user device 210 may present options for the user to select, controls for the user to actuate, and/or cursors or other indicators for the user to direct. The user device 210 may further accept data entry from the user, including numbers to dial or various parameter values for configuring the operation of the handset. The user device 210 may further execute one or more software or firmware applications in response to user commands. These applications may configure the user device 210 to perform various customized functions in response to user interaction. Additionally, the user device 210 may be programmed and/or configured over-the-air, for example from a wireless base station, a wireless access point, or a peer user device 210.

The user device 210 may execute a web browser application which enables the display 402 to show a web page. The web page may be obtained via wireless communications with a cell tower 406, a wireless network access node, a peer user device 210 or any other wireless communication network or system. The cell tower 406 (or wireless network access node) is coupled to a wired network 408, such as the Internet. Via the wireless link and the wired network, the user device 210 has access to information on various servers, such as a server 410. The server 410 may provide content that may be shown on the display 402. Alternately, the user device 210 may access the cell tower 406 through a peer user device 210 acting as an intermediary, in a relay type or hop type of connection.

Figure 5:
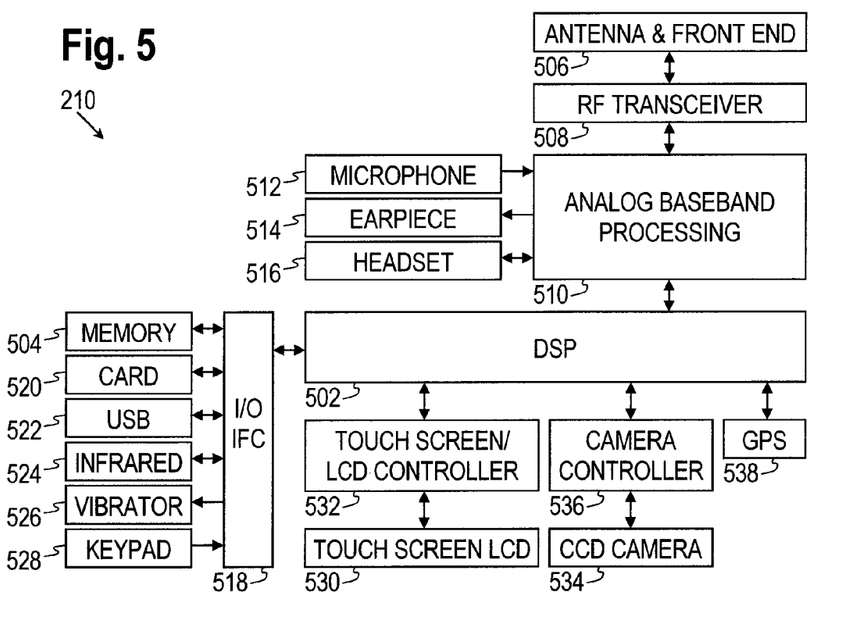
FIG. 5 is a block diagram of a user device operable for some of the various embodiments of the disclosure.

FIG. 5 shows a block diagram of the user device 210. While a variety of known components of user devices 210 are depicted, in an embodiment a subset of the listed components and/or additional components not listed may be included in the user device 210. The user device 210 includes a digital signal processor (DSP) 502 and a memory 504. As shown, the user device 210 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the user device 210 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the user device 210 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the user device 210 to send and receive information from a cellular network or some other available wireless communications network or from a peer user device 210. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the user device 210 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the user device 210 to function as a peripheral device to exchange information with a personal computer or other computer system. The infrared port 524 and other optional ports such as a Bluetooth interface or an IEEE 802.11 compliant wireless interface may enable the user device 210 to communicate wirelessly with other nearby handsets and/or wireless base stations.

The input/output interface 518 may further connect the DSP 502 to the vibrator 526 that, when triggered, causes the user device 210 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the user device 210. Another input mechanism may be the touch screen LCD 530, which may also display text and/or graphics to the user. The touch screen LCD controller 532 couples the DSP 502 to the touch screen LCD 530.

The CCD camera 534 enables the user device 210 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the user device 210 to determine its position. Various other peripherals may also be included to provide additional functions, e.g., radio and television reception.

Figure 6:
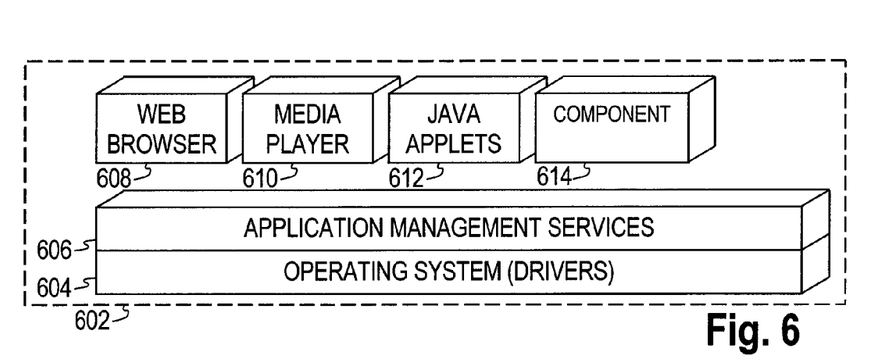
FIG. 6 is a diagram of a software environment that may be implemented on a user device operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the user device 210. Also shown in FIG. 6 are a web browser application 608, a media player application 610, and Java applets 612. The web browser application 608 configures the user device 210 to operate as a web browser, allowing a user to enter information into forms and select links to retrieve and view web pages. The media player application 610 configures the user device 210 to retrieve and play audio or audiovisual media. The Java applets 612 configure the user device 210 to provide games, utilities, and other functionality. A component 614 might provide functionality related to keyword management.

Figure 7:
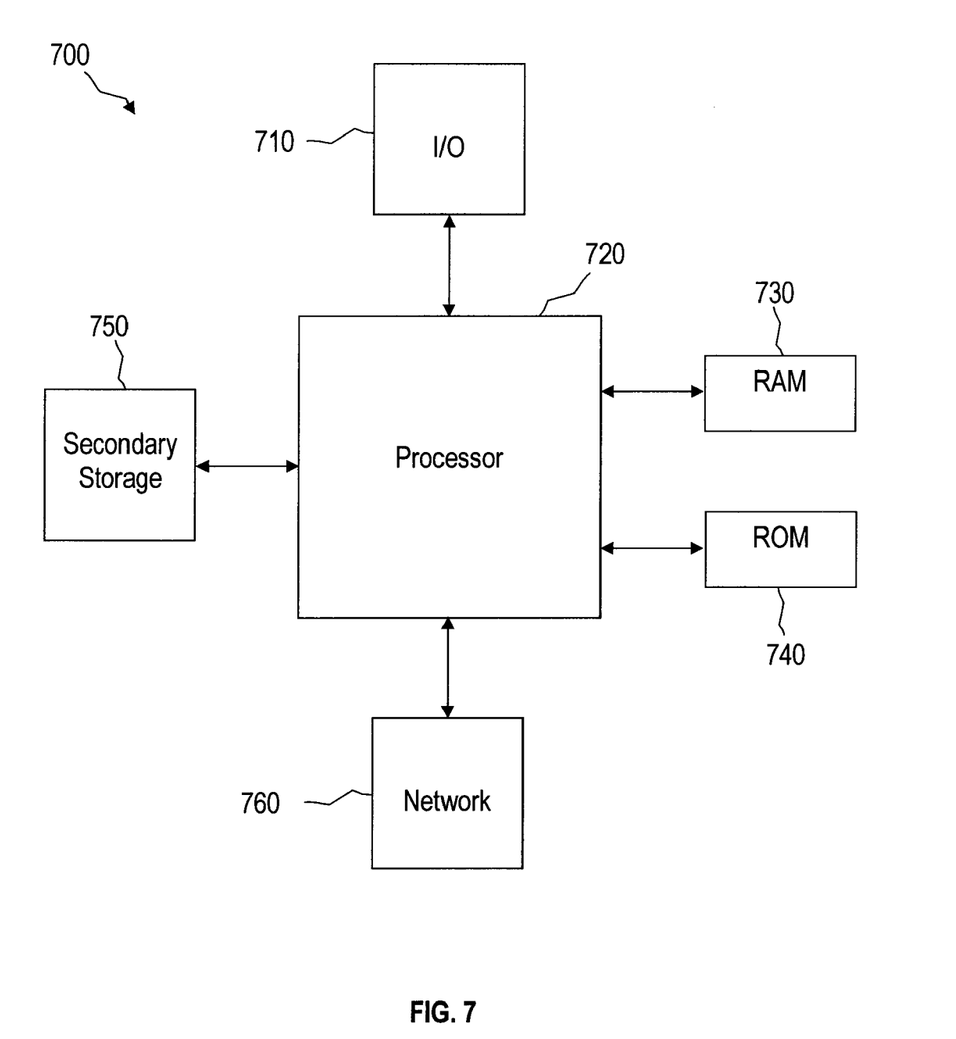
FIG. 7 is an illustrative general purpose computer system suitable for some of the various embodiments of the disclosure.

The user device 210, the processing server 250, the advertisement service 260, and/or the content server 270 may include any general-purpose or special-purpose computer with sufficient processing power, memory resources, and network throughput capability to handle the necessary workload placed upon it. FIG. 7 illustrates a typical, general-purpose computer system 700 that may be suitable for implementing one or more embodiments disclosed herein. Similar components and functions might also be applicable to a suitable special-purpose computer. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for selecting customized content for a user device, comprising:
    receiving information into the user device from a plurality of sources, the information comprising text entered into a messaging program at the user device;
    analyzing the information to obtain at least one keyword from each of at least two of the plurality of sources;
    analyzing the keywords from at least two of the plurality of sources to obtain a prioritized list of keywords; and
    using the prioritized list of keywords to select customized content for the user device.

2. The method of claim 1, wherein the received information further comprises sounds made by a user into the user device.

3. The method of claim 1, further comprising translating at least one keyword in the prioritized list of keywords into a format usable by an application on the user device.

4. The method of claim 1, wherein the customized content is an advertisement.

5. The method of claim 1, wherein analyzing the information comprises:
    obtaining at least one keyword from analyzing data entered into the user device; and
    obtaining at least one keyword from analyzing a behavior of a user of the user device.

6. The method of claim 5, wherein obtaining the at least one keyword from analyzing data entered into the user device and obtaining the at least one keyword from analyzing the behavior of the user of the user device occur as background processes to other processes executing on the user device.

7. The method of claim 5, wherein analyzing the information further comprises:
    analyzing information from a temporal profile, the temporal profile maintaining time-related data;
    analyzing information from a general profile, the general profile maintaining general data about the user of the user device; and
    analyzing information from an application profile, the application profile maintaining data related to applications that the user of the user device has launched and activities that the user of the user device has engaged in while using the applications.

8. The method of claim 5, wherein at least a portion of the obtaining the at least one keyword from analyzing data entered into the user device and obtaining the at least one keyword from analyzing the behavior of the user of the user device occurs on a processor other than a processor on the user device.

9. A system for selecting customized content for a user device, comprising:
- a processor;
- an information extractor when executed by the processor configured to obtain at least one keyword from analyzing data entered into the user, device the data comprising text entered into a messaging program at the user device;
- a behavioral engine when executed by the processor configured to obtain at least one keyword from analyzing a behavior of a user of the user device; and
- a keyword manager when executed by the processor configured to receive at least two keywords from at least one of the information extractor and the behavioral engine, the keyword manager further configured to analyze the at least two keywords to obtain a prioritized list of keywords and to provide the prioritized list of keywords to a component configured to select customized content for the user device based on the prioritized list of keywords.

10. The system of claim 9, wherein at least a portion of the processing performed by the information extractor and the behavioral engine occurs as a background process to other processes executing on the user device.

11. The system of claim 9, wherein at least a portion of the processing performed by the information extractor and the behavioral engine occurs on a processor other than the processor on the user device.

12. The system of claim 9, further comprising:
- a temporal profile maintaining time-related data;
- a general profile maintaining general data about the user of the user device; and
- an application profile maintaining data related to applications that the user of the user device has launched and activities that the user of the user device has engaged in while using the applications.

13. The system of claim 12, wherein at least one keyword is obtained from at least one of analyzing information from the temporal profile, analyzing information from the general profile, and analyzing information from the application profile.

14. The system of claim 9, further comprising a translator operable to translate at least one keyword in the prioritized list of keywords into a format usable by an application on the user device.

15. The system of claim 9, wherein the behavioral engine processes information provided by a pattern recognizer operable to recognize a pattern in a behavior of the user of the user device.

16. The system of claim 9, wherein the customized content is an advertisement.

17. A user device to display information customized for a user of the user device, comprising:
- a processor;
- an information extractor when executed by the processor configured to obtain at least one keyword from analyzing data entered into the user device, the data comprising text entered into a messaging program at the user device;
- a behavioral engine when executed by the processor configured to obtain at least one keyword from analyzing a behavior of the user of the user device; and
- a keyword manager engine when executed by the processor configured to receive at least two keywords from at least one of the information extractor and the behavioral engine, the keyword manager further configured to analyze the at least two keywords to obtain a prioritized list of keywords and to provide the prioritized list of keywords to a component configured to select customized content for the user device based on the prioritized list of keywords and to provide the customized content to the user device for display on the user device.

18. The user device of claim 17, wherein at least a portion of the processing performed by the information extractor and the behavioral engine occurs as a background process to other processes executing on the user device.

19. The user device of claim 17, wherein at least a portion of the processing performed by the information extractor and the behavioral engine occurs on a processor other than the processor on the user device.

20. The user device of claim 17, further comprising:
- a temporal profile maintaining time-related data;
- a general profile maintaining general data about the user of the user device; and
- an application profile maintaining data related to applications that the user of the user device has launched and activities that the user of the user device has engaged in while using the applications.

21. The user device of claim 20, wherein at least one keyword is obtained from at least one of analyzing information from the temporal profile, analyzing information from the general profile, and analyzing information from the application profile.

22. The user device of claim 17, further comprising a translator operable to translate at least one keyword in the prioritized list of keywords into a format usable by an application on the user device.

23. The user device of claim 17, wherein the behavioral engine processes information provided by a pattern recognizer operable to recognize a pattern in a behavior of the user of the user device.

24. The user device of claim 17, wherein the customized content is an advertisement.

* * * * *